US012620191B1

(12) United States Patent　　　　(10) Patent No.:　US 12,620,191 B1
Luan et al.　　　　　　　　　　　　(45) Date of Patent:　　　　May 5, 2026

(54) METHOD AND SYSTEM FOR SEMANTIC PERCEPTION EDITING OF OBJECTS IN THREE-DIMENSIONAL SCENE

(71) Applicants:Wuhan University of Technology, Wuhan (CN); Wuhan Qikai Information Technology Development Co., LTD, Wuhan (CN)

(72) Inventors: Fengkai Luan, Wuhan (CN); Hu Zhang, Wuhan (CN); Jiaxing Yang, Wuhar (CN); Zhengqi Liang, Wuhan (CN); Siliang Sun, Wuhan (CN); Yuyang Xia, Wuhan (CN)

(73) Assignees: Wuhan University of Technology, Wuhan (CN); Wuhan Qikai Information Technology Development Co., LTD, Wuhan (CN)

( * ) Notice: Subject to any disclaimer, the term of this patent is extended or adjusted under 35 U.S.C. 154(b) by 0 days.

(21) Appl. No.: 19/356,067

(22) Filed: Oct. 11, 2025

(30) Foreign Application Priority Data

Aug. 27, 2025　(CN) ......................... 202511204993.9

(51) Int. Cl.
　　G06T 19/20　　　(2011.01)
　　G06T 15/60　　　(2006.01)
(52) U.S. Cl.
　　CPC .............. G06T 19/20 (2013.01); G06T 15/60 (2013.01); G06T 2219/2021 (2013.01)

(58) Field of Classification Search
　　CPC .. G06T 19/20; G06T 15/60; G06T 2219/2021
　　See application file for complete search history.

(56) References Cited

U.S. PATENT DOCUMENTS

2022/0156536 A1 * 5/2022 Oh .......................... G06V 20/10
2025/0316046 A1 * 10/2025 Woodard, Jr. ......... G06N 3/084

FOREIGN PATENT DOCUMENTS

CA　　　3207598 A1 * 9/2022 ........... G06N 3/0455
CN　　114332394 A * 4/2022

* cited by examiner

*Primary Examiner* — Xin Sheng
(74) *Attorney, Agent, or Firm* — Hemisphere Law, PLLC

(57)　　　　　　ABSTRACT
A method for semantic perception editing of objects in a three-dimensional scene includes steps as follows: input point cloud data of a three-dimensional scene is analyzed by using a three-dimensional instance segmentation network, and a current position and a bounding box of a target object are determined based on an editing instruction. A set of semantic relationship rules between the multiple object instances from a historical editing case database is learned by using a Bayesian dynamic updating mechanism, and dynamic semantic constraints are dynamically generated. Editing operations are converted into a standardized mathematical representation by using a unified parametric framework, and the verified editing operations are optimized based on a comprehensive loss minimizing function to obtain optimized editing parameters. The three-dimensional scene is transformed based on the optimized editing parameters to obtain the edited three-dimensional scene.

20 Claims, 6 Drawing Sheets

S1, analyzing, using a three-dimensional instance segmentation network, input point cloud data of the three-dimensional scene to obtain multiple object instances and semantic labels of the multiple object instances, a set of supporting surfaces of the multiple object instances, a spatial relationship graph among the multiple object instances, and scene environmental features, and determining a current position and a bounding box of a target object based on an editing instruction S2, learning, using a Bayesian dynamic updating mechanism, a set of semantic relationship rules between the multiple object instances from a historical editing case database, and dynamically generating dynamic semantic constraints based on the set of semantic relationship rules and the scene environmental features;

S3, converting, using a unified parametric framework, editing operations into a standardized mathematical representation, calculating a comprehensive semantic constraint score based on the dynamic semantic constraints to verify rationality of the editing operations, thereby to determine verified editing operations, and optimizing, based on a comprehensive loss minimizing function, the verified editing operations to obtain optimized editing parameters S4, transforming, using a unified editing operation execution engine, the three-dimensional scene based on the optimized editing parameters, and updating the spatial relationship graph and the set of supporting surfaces to obtain the edited three-dimensional scene S1, analyzing, using a three-dimensional instance segmentation network, input point cloud data of the three-dimensional scene to obtain multiple object instances and semantic labels of the multiple object instances, a set of supporting surfaces of the multiple object instances, a spatial relationship graph among the multiple object instances, and scene environmental features, and determining a current position and a bounding box of a target object based on an editing instruction S2, learning, using a Bayesian dynamic updating mechanism, a set of semantic relationship rules between the multiple object instances from a historical editing case database, and dynamically generating dynamic semantic constraints based on the set of semantic relationship rules and the scene environmental features;

S3, converting, using a unified parametric framework, editing operations into a standardized mathematical representation, calculating a comprehensive semantic constraint score based on the dynamic semantic constraints to verify rationality of the editing operations, thereby to determine verified editing operations, and optimizing, based on a comprehensive loss minimizing function, the verified editing operations to obtain optimized editing parameters S4, transforming, using a unified editing operation execution engine, the three-dimensional scene based on the optimized editing parameters, and updating the spatial relationship graph and the set of supporting surfaces to obtain the edited three-dimensional scene

METHOD AND SYSTEM FOR SEMANTIC PERCEPTION EDITING OF OBJECTS IN THREE-DIMENSIONAL SCENE

TECHNICAL FIELD

The disclosure relates to the field of three-dimensional editing technologies, and particularly to a method and system for semantic perception editing of objects in a three-dimensional scene.

BACKGROUND

With the rapid development of embodied intelligence and robotics, scene perception and understanding capabilities of robots in complex three-dimensional environments have become a key technological bottleneck. To train and test the scene perception algorithms of robots, a large number of diverse three-dimensional scene datasets are required. However, traditional data collection methods are costly and have limited scene diversity. The three-dimensional scene editing technologies provide an important means to expand the training datasets for the embodied intelligence. However, the existing three-dimensional scene editing is mainly based on geometric transformations and lack understanding and constraints of semantic relationships between objects. When performing editing operations such as object movement, the existing three-dimensional scene editing often does not consider physical plausibility and semantic consistency, which can easily lead to unreasonable phenomena such as floating objects, interpenetration, or semantic mismatches. These problems seriously affect the quality of the generated datasets and the training effectiveness of robot scene perception algorithms.

The Chinese patent with the publication No. CN117237575A discloses a method for indoor scene generation, a control device, and a readable storage medium. The patent achieves automated generation of virtual indoor scene data through a technical solution that involves constructing a static three-dimensional scene based on a virtual scene, generating a task trajectory according to task type of the robot, performing collision checks to obtain check results, and ultimately generating an indoor scene. This method employs a hierarchical construction, which includes the random placement of environmental layout assets, large virtual scene assets, small virtual scene assets, and decorative virtual scene assets. It ensures the validity of the scene by performing collision checks based on a task trajectory of the robot and generates various data formats such as red green and blue (RGB) images, depth maps, and semantic information through a physics simulation engine. However, the patent mainly focuses on the automated generation of scenes and lacks the ability to intelligently edit existing scenes.

It cannot perform semantic perception-based object operations and scene modifications on existing three-dimensional scenes according to user instructions.

SUMMARY

In view of the above, the disclosure provides a method and system for semantic perception editing of objects in a three-dimensional scene. By establishing a semantic relationship learning mechanism and a multi-dimensional constraint verification system, the disclosure achieves intelligent editing operations on objects in three-dimensional scenes, ensuring that the editing results meet the requirements of physical plausibility and semantic consistency. This provides high-quality and diverse training datasets for embodied intelligence and robot scene perception algorithms, enhancing ability of the robots to understand and interact with complex three-dimensional environments.

The technical solutions of the disclosure are as follows.

On the one hand, the disclosure provides a method for semantic perception editing of objects in a three-dimensional scene, which includes steps S1-S4.

In the step S1, input point cloud data of a three-dimensional scene is analyzed by using a three-dimensional instance segmentation network to obtain multiple object instances and semantic labels of the multiple object instances, a set of supporting surfaces of the multiple object instances, a spatial relationship graph among the multiple object instances, and scene environmental features, and a current position and a bounding box of a target object are determined based on an editing instruction.

In the step S2, a set of semantic relationship rules between the multiple object instances from a historical editing case database is learned by using a Bayesian dynamic updating mechanism, and dynamic semantic constraints are dynamically generated based on the set of semantic relationship rules and the scene environmental features.

In the step S3, editing operations are converted into a standardized mathematical representation by using a unified parametric framework, a comprehensive semantic constraint score is calculated based on the dynamic semantic constraints to verify rationality of the editing operations, thereby to determine verified editing operations, and the verified editing operations are optimized based on a comprehensive loss minimizing function to obtain optimized editing parameters.

In the step S4, the three-dimensional scene is transformed based on the optimized editing parameters by using a unified editing operation execution engine, and the spatial relationship graph and the set of supporting surfaces are updated to obtain the edited three-dimensional scene.

On the other hand, the disclosure provides a system for the semantic perception editing of objects in a three-dimensional scene, which includes a three-dimensional scene analyzing module, a semantic relationship learning module, and an editing operation execution module. The three-dimensional scene analyzing module is configured to analyze, using the three-dimensional instance segmentation network, the input point cloud data of the three-dimensional scene to recognize the multiple object instances and the semantic labels of the multiple object instances in the three-dimensional scene, extract the global spatial structural information of the three-dimensional scene and the scene environmental features, and determine the current position of the target object in the three-dimensional scene. The semantic relationship learning module is configured to learn, using the Bayesian dynamic updating mechanism, the set of semantic relationship rules between the multiple object instances, establish an object semantic attribute database, and dynamically generate the dynamic semantic constraints based on the set of semantic relationship rules and the scene environmental features. The editing operation execution module is configured to receive the editing instruction and perform parametric processing, verify the rationality of the editing operations based on the dynamic semantic constraints, optimize the verified editing operations through the comprehensive loss minimizing function, and execute the corresponding editing operations to generate the edited three-dimensional scene.

The beneficial effects of the disclosure are as follow.

(1) The disclosure automatically learns a set of semantic relationship rules from historical editing cases through a Bayesian dynamic updating mechanism, and achieves semantic perception-based three-dimensional scene editing in combination with comprehensive constraint verification of support, stability, and compatibility. This method overcomes the technical shortcomings of the related art that rely on fixed rule constraints and lack semantic understanding. It can dynamically generate personalized semantic constraints according to the scene context, ensuring that the editing results meet both physical plausibility and semantic consistency requirements. It provides a means of expanding high-quality and diverse training datasets for embodied intelligence systems.

(2) The disclosure uses the Beta distribution to model the posterior probability of semantic relationship rules, and automatically adjusts the rule weights according to the quality feedback of historical editing results through the Bayesian updating formula, achieving adaptive learning of semantic constraints. This mechanism introduces uncertainty modeling to avoid the oscillation problems of traditional gradient updates, enabling the system to continuously learn and improve from editing experience. Compared with existing methods with fixed rule constraints, it enhances the ability to understand the semantic rationality of complex living scenes.

(3) The disclosure establishes a unified parametric representation framework that includes four types of editing operations: a deletion operation, a generation operation, a movement operation, and a swap operation. It achieves consistent processing of different editing types through standardized mathematical representations. This framework optimizes editing parameters in combination with a comprehensive loss function. The design of semantic weighted orientation deviation loss, graph embedding matching loss, and voxel semantic interference penalty ensures effective semantic constraints during the editing process, improving the accuracy and controllability of editing operations.

The primary objective of the disclosure is to provide high-quality and diverse training datasets for embodied intelligence and robot scene perception algorithms. Specifically, it provides high-quality and diverse training datasets for embodied intelligence and robot scene perception algorithms, enhances the ability of robots to understand and interact with complex three-dimensional environments, and offers a means of expanding high-quality and diverse training datasets for embodied intelligence systems.

BRIEF DESCRIPTION OF DRAWINGS

In order to provide a clearer explanation of the embodiments of the disclosure or the technical solutions in the related art, a brief introduction will be given below to the attached drawings required for the description of the embodiments or the related art. It is apparent that the attached drawings described below are only illustrative embodiments of the disclosure. For those skilled in the art, other drawings can be obtained based on these drawings without creative labor.

FIG. 1 illustrates a flowchart of a method for semantic perception editing of objects in a three-dimensional scene in the disclosure.

DETAILED DESCRIPTION OF EMBODIMENTS

Figure 2:
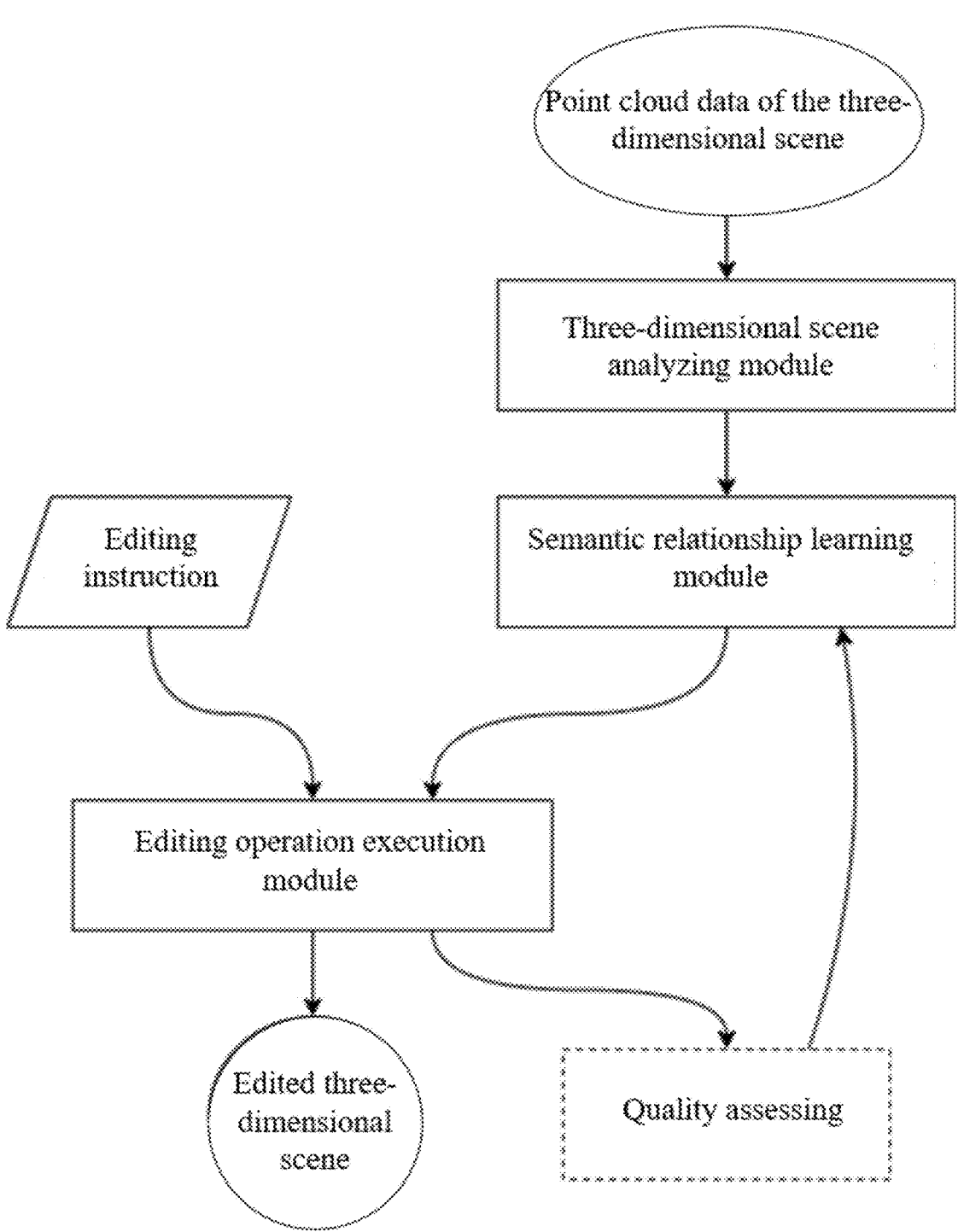
FIG. 2 illustrates a schematic structural diagram of a system for semantic perception editing of objects in a three-dimensional scene according to an embodiment of the disclosure.

The technical solutions in the embodiments of the disclosure will be clearly and completely described below in conjunction with the embodiments of the disclosure. Apparently, the described embodiments are only a part of the embodiments of the disclosure, not all of them. Based on the embodiments of the disclosure, all other embodiments obtained by those skilled in the art without creative labor are within the scope of protection of the disclosure.

Figure 1:
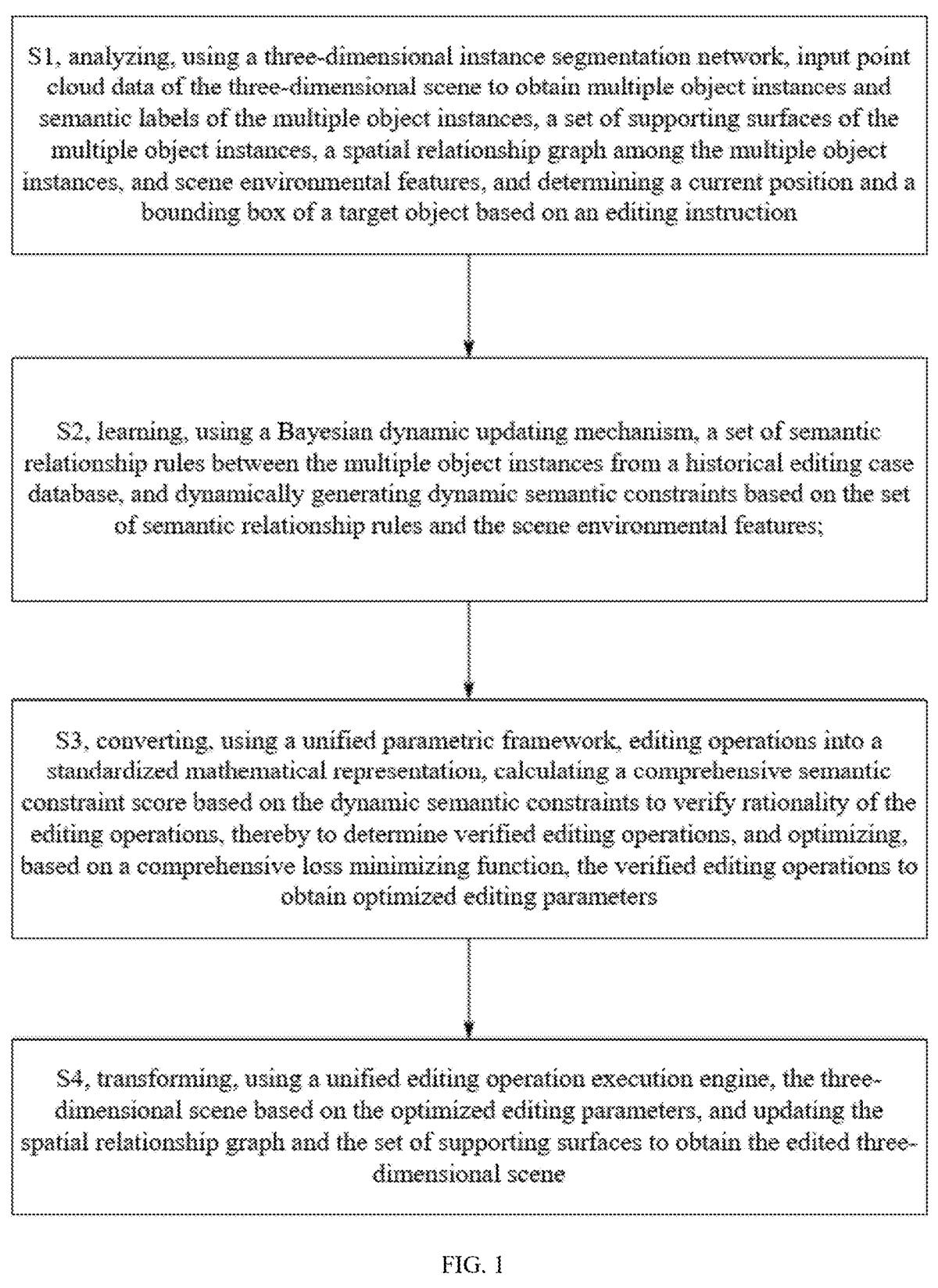

As shown in FIG. 1, a method for semantic perception editing of objects in a three-dimensional scene is provided, which includes steps S1-S4.

In the step S1, input point cloud data of a three-dimensional scene is analyzed by using a three-dimensional instance segmentation network to obtain multiple object instances and semantic labels of the multiple object instances, a set of supporting surfaces of the multiple object instances, a spatial relationship graph among the multiple object instances, and scene environmental features, and a current position and a bounding box of a target object are located based on an editing instruction.

In the step S2, a set of semantic relationship rules between the multiple object instances from a historical editing case database is learned by using a Bayesian dynamic updating mechanism, and dynamic semantic constraints are dynamically generated based on the set of semantic relationship rules and the scene environmental features.

In the step S3, editing operations are converted into a standardized mathematical representation by using a unified parametric framework, a comprehensive semantic constraint score is calculated based on the dynamic semantic constraints to verify rationality of the editing operations, thereby to determine verified editing operations, and the verified editing operations are optimized based on a comprehensive loss minimizing function to obtain optimized editing parameters.

In the step S4, the three-dimensional scene is transformed based on the optimized editing parameters by using a unified editing operation execution engine, and the spatial relationship graph and the set of supporting surfaces are updated to obtain the edited three-dimensional scene.

In an embodiment, specifically, the step S1 includes steps S11-S14.

In the step S11, the input point cloud data of the three-dimensional scene is decomposed into the multiple object instances by using the three-dimensional instance segmentation network, and each of the multiple object instances includes a point set and a semantic label.

In this embodiment, the three-dimensional instance segmentation network based on the PointNet++ architecture is used to semantically analyze the input point cloud data of the three-dimensional scene, the three-dimensional scene is decomposed into object instances being M in quantities $O=\{O_j|j=1, 2, \ldots, M\}$. Each of the object instances includes a point set $\mathbf{0}_j = \{p_i|instance(p_i)=j\}$ and a semantic label $s_j \in S$, where $S=\{deck, chair, cup, book, \ldots\}$ and $S'$ represents a predefined set of semantic categories.

In the step S12, global spatial structural information of the three-dimensional scene is extracted, which includes the set of supporting surfaces being capable of bearing objects, free space regions, and the spatial relationship graph among the multiple object instances.

In this embodiment, based on object instances after segmentation (i.e., decomposing), the global spatial structural information of the three-dimensional scene is extracted. First, the set of supporting surfaces $F=f_k$ being capable of bearing objects is identified, by detecting planes from horizontal or near-horizontal surfaces such as the floor, tabletops, and cabinet surfaces using a plane detection algorithm. Meanwhile, the free space region $V_{free}$ is calculated, representing the three-dimensional spatial area in the scene that is not occupied by objects and is available for object placement. The occupancy status of each voxel is determined through voxel representation and occupancy grid calculation. A spatial relationship graph $G_{spatial}=(V, E)$ between objects is constructed, where the node set $\Gamma$ corresponds to object instances, and the edge set/represents spatial adjacency relationships between objects, such as "above," "adjacent to," "supporting," and other geometric relationships.

In the step S13, the scene environmental features are obtained from analyzing the input point cloud data of the three-dimensional scene, which includes supporting surface load-bearing information, object material properties, and spatial distribution information.

In this embodiment, based on the material type and geometric features of the supporting surfaces, the maximum load-bearing capacity $w_{max}(f_k)$ of each supporting surface $f_k$ is estimated; in combination with visual features and the semantic labels, the material properties of objects are inferred, including physical parameters such as weight, hardness, and surface roughness; and the spatial distribution density and clustering patterns of objects in the scene are statistically analyzed to understand the overall layout patterns of the scene.

In the step S14, the editing instruction is received and the current position, and the bounding box of the target object in the three-dimensional scene are located based on the editing instruction.

In this embodiment, an editing instruction $E=(T, O_{target}, \Theta)$ input by the user is received, where $T \in \{deletion, generation, movement, swap\}$ represents types of editing operations, $O_{target}$ represents the identifier of the target object, and $\Theta$ represents the set of operation parameters. Based on the target object identifier $O_{target}$ in the editing instruction, the target object is located among the analyzed object instances. The current position of the target object $p_{current}=centroid$ $(O_{target})$ is calculated, which is the centroid coordinates of the target object's point cloud; simultaneously, the three-dimensional bounding box of the target object $B_{target}=(b_{min}, b_{max})$ is calculated, where $b_{min}$ and $b_{max}$ represent a minimum coordinate value and a maximum coordinate value of the bounding box, respectively.

In an embodiment, the step S2 include steps S21-S25.

In the step S21, a database $A=\{(s_i, a_i)|s_i \in S\}$ associating the semantic labels of the multiple object instances with semantic attribute vectors is established, where $s_i$ represents a corresponding semantic label of an i-th object instance of the multiple object instances, S represents a set of the semantic labels, and $\alpha_i=[w_i, v_i, \mu_i, \sigma_i, \tau_i]^T$ represents a semantic attribute vector of the i-th object instance an i-th object instance including weight (in units of kilograms, i.e., kg), volume (in units of cubic meter, i.e., m$^3$), material hardness (in units of Vickers hardness, i.e., HV), surface roughness (in units of micro meter, i.e., μm), and thermal conductivity (in units of watt per meter Kelvin, i.e., W/(m·K)).

In the step S22, the set of semantic relationship rules between among $R_{semantic}=\{r_{ij}|r_{ij}:s_i \times s_j \to [0,1], s_i, s_j \in S\}$ is defined, where $r_{ij}$ represents a compatibility score function between the semantic label $s_i$ and a semantic label $s_j$, indicating the placement compatibility between objects of different semantic categories, and $r_{ij}$ is taken as the semantic relationship rule. $r_{ij}$ reflects the rationality of the coexistence of objects $s_i$ and $s_j$ in the same scene, with a value range of [0,1], where 0 indicates complete incompatibility and 1 indicates complete compatibility.

In the step S23, each semantic relationship rule $r_{ij}$ is treated as a posterior probability that follows a Beta distribution $Beta(\alpha_{ij}, \beta_{ij})$, where $\alpha_{ij}$ represents an accumulated parameter of successful evidence corresponding to the semantic relationship rule $r_{ij}$, which indicates the number of times that the object combination has produced good editing results in historical cases; and $\beta_{ij}$ represents an accumulated parameter of failed evidence corresponding to the semantic relationship rule $r_{ij}$, which indicates the number of times that the object combination has produced poor editing results in historical cases; during initialization, set the prior distribution to $Beta(\alpha_0, \beta_0)$, where $\alpha_0>0, \beta_0>0$ are hyperparameters, each o of which represents an initial confidence level.

In the step S24, the posterior parameters are updated based on the feedback loss from the historical editing case database $$\mathcal{H} = \left\{E^{(h)}, Q_{total}^{(h)}\right| h = 1, 2, \ldots, NH\},$$

where $E^{(h)}$ represents an h-th historical editing operation, $$Q_{total}^{(h)} \in [0, 1]$$

represents a quality score corresponding the h-th historical editing operation, and NH represents a total number of historical cases. And formulas for updating the posterior parameters are expressed as follows:

$$\alpha_{ij}^{(t+1)} = \alpha_{ij}^{(t)} + \left(1 - L_{feedback}^{(h)}\right) \cdot \kappa$$

$$\beta_{ij}^{(t+1)} = \beta_{ij}^{(t)} + L_{feedback}^{(h)} \cdot \kappa$$

$$r_{ij}^{(t+1)} = \frac{\alpha_{ij}^{(t+1)}}{\alpha_{ij}^{(t+1)} + \beta_{ij}^{(t+1)}}$$

where $$L_{feedback}^{(h)} = 1 - Q_{total}^{(h)}$$

represents the feedback loss, t represents a current time step, t+1 represents an updated time step, and $\kappa$ represents an updated intensity factor, configured to control feedback sensitivity.

After updating the posterior parameters $$\alpha_{ij}^{(t+1)}$$

and $$\beta_{ij}^{(t+1)},$$

a posterior mean $$r_{ij}^{(t+1)} = \alpha_{ij}^{(t+1)}/(\alpha_{ij}^{(t+1)} + \beta_{ij}^{(t+1)})$$  20 is taken as a new rule value.

The principle of this Bayesian update is to cumulatively update the distribution parameters based on the feedback of "successful evidence"

$$\left(1 - L_{feedback}^{(h)}\right)$$

and "failed evidence"

$$\left(L_{feedback}^{(h)}\right).$$

When the quality of the editing result for a certain object combination is high, the posterior mean will shift towards 1; conversely, it will shift towards 0. The derivation of this mechanism is based on Bayesian theorem: $P(r|data) \propto P(data|r) \cdot P(r)$, where a likelihood $P(data|r)$ is approximated by $$L_{feedback}^{(h)}.$$

The introduction of uncertainty modeling makes the update more robust, avoiding the oscillation problems associated with simple gradient updates.

In the step S25, the dynamic semantic constraints including support constraints, stability constraints, and compatibility constraints are dynamically generated based on the learned set of semantic relationship rules and the scene environmental features.

The support constraints: $C_{support} = \mathbb{I}[is\_support\_surface(f_{dest}) \wedge w_{target} \leq w_{max}(f_{dest})]$, where $\mathbb{I}[\cdot]$ represents an indicator function; $f_{dest}$ represents a target support surface selected from the set of support surfaces, and $f_{dest} \in F$, is_support_surface$(f_{dest}):F \rightarrow \{0,1\}$ represents a support surface determination function;, F represents the set of all support surfaces in the three-dimensional scene; $w_{target}$ represents a weight of the target object; $w_{max}(f_{dest}) > 0$, $w_{max}(f_{dest})$ represents a maximum load-bearing capacity of the target support surface $f_{dest}$; and $\wedge$ represents a logical operator.

The stability constraints: $C_{stability} = \mathbb{I}[contact\_area(O_{target}, f_{dest}) \geq A_{min}]$, ensuring that the contact area meets stability requirements, where contact_area$(O_{target}, f_{dest})$ represents a contact area calculation function; $O_{target}$ represents the target object; and $A_{min} > 0$, and $A_{min}$ represents a minimum contact area required to ensure stability.

The compatibility constraints $C_{compatibility} = \mathbb{I}[r_{target,env} \geq \rho_{threshold}]$ is used to verify semantic compatibility between objects and the environment, where $r_{target,env} \in [0,1]$, and $r_{target,env}$ represents a compatibility score between the target object and environment calculated based on the set of semantic relationship rules $R_{semantic}$; $\rho_{threshold} \in [0,1]$, and $\rho_{threshold}$ represents a compatibility determination threshold. And $r_{target,env}$ is obtained according to a formula expressed as follows:

$$r_{target,env} = \frac{1}{|N_{env}|} \sum_{j \in N_{env}} r_{target,j}$$

where $N_{env}$ represents the set of adjacent objects in the environment, and $r_{target,j}$ represents a compatibility score between the target object and a j-th object.

In an embodiment, specifically, the step S3 includes steps S31-S34.

In the step S31, the unified parametric framework is established and the standardized representation of the four types of editing operations is obtained.

The editing instruction $E=(T, O_{target}, \Theta)$ obtained from step S1 is received, and a unified parametric framework for editing operations is established, different types of editing operations are converted into standardized mathematical representations. For deletion operations, the removal region $R_{remove} = \{p_i | p_i \in O_{target}\}$ and the area of influence $R_{affect} = \{p_i \in P | \|p_i - centroid(O_{target})\| \leq r_{affect}\}$ are defined, where $r_{affect} > 0$, and $r_{affect}$ represents a radius of influence; for generation operations, the generation location $p_{gen}$ and object parameters $\phi_{gen} = (s_{type}, d_{size}, \theta_{pose})$ are determined, where $s_{type} \in S$, and $s_{type}$ represents the type of the generated object, $d_{size}$ represents a size parameter, and $\theta_{pose}$ represents a pose parameter; for movement operations, the core parameters include the transformation matrix $T_{move} = [R|t]$, where the rotation matrix R and the translation vector t are the transformation parameters; for swap operations, a pair of swap transformations for two objects $(T_1, T_2)$ is defined.

In the step S32, a comprehensive semantic constraint score is calculated.

Based on the dynamic semantic constraints obtained from step S2, the comprehensive semantic constraint score for rationality verification is calculated. The formula for calculating the comprehensive semantic constraint score is:

$$S_{semantic} = \gamma_1 \cdot C_{support} + \gamma_2 \cdot C_{stability} + \gamma_3 \cdot C_{compatibility}$$

where $S_{semantic}$ represents the comprehensive semantic constraint score; $C_{support}$ represents the support constraints; $C_{stability}$ represents the stability constraints; $C_{compatibility}$ represents the compatibility constraints; $\gamma_1$, $\gamma_2$, and $\gamma_3$ represent weight coefficients for $C_{support}$, $C_{stability}$, and $C_{compatibility}$, respectively, satisfy $\gamma_1 + \gamma_2 + \gamma_3 = 1$, and the weight coefficients are dynamically adjusted according to the type of editing operation. The editing operation is only allowed to be executed when $S_{semantic} \geq S_{threshold}$, where $S_{threshold} \in [0,1]$ and $S_{threshold}$ represents a semantic verification threshold.

In the step S33, a comprehensive loss function is constructed.

For editing operations that pass the verification, the comprehensive loss function is constructed as follows:

$$L_{total} = \omega_1 \cdot L_{orientation} + \omega_2 \cdot L_{semantic} + \omega_3 \cdot L_{interference}$$

$$L_{orientation} = \|a_{target} \odot (\theta_{pose} - \theta_{ideal})\|_2^2$$

$$L_{semantic} = \|E(G_{spatial}) - E(\hat{G}_{spatial})\|_F$$

$$L_{interference} = \sum_{v \in V_{voxel}} \exp(-r_v/\tau) \cdot \mathbb{I}[occ(v) > occ_{thresh}]$$

where $L_{total}$ represents the comprehensive loss function; $L_{orientation}$ represents an orientation deviation loss, calculating the deviation of the object's orientation relative to the ideal orientation; $L_{semantic}$ represents a graph embedding matching loss, quantifying the expected deviation of semantic relationships before and after editing; $L_{interference}$ represents a voxel semantic interference penalty, assessing the degree of spatial interference; $\omega_1$, $\omega_2$, and $\omega_3$ represent weight coefficients for $L_{orientation}$, $L_{semantic}$, and $L_{interference}$, respectively, and satisfy $\omega_1 + \omega_2 + \omega_3 = 1$; $\alpha_{target}$ represents a semantic attribute vector of the target object (weight, volume, hardness, roughness, thermal conductivity); $\odot$ represents element-wise multiplication, implementing semantic perception-based weight adjustment; $\theta_{pose}$ represents a current orientation; $\theta_{ideal}$ represents an ideal orientation calculated based on the normal vector of the supporting surface $$n_{dest}; \|\cdot\|_2^2$$

represents a squared L2 norm; $E(\cdot)$ represents an embedding matrix generated by a graph neural network; $G_{spatial}$ represents a current spatial relationship graph; $\hat{G}_{spatial}$ represents a predicted post-editing spatial relationship graph (obtained through the graph transformation function $\hat{G}_{spatial} =$ transform $(G_{spatial}, T, O_{target}, \Theta)$); $\|\cdot\|_F$ represents a Frobenius norm; $V_{voxel}$ represents a voxel grid partition of the three-dimensional scene; $r_v$ represents an average compatibility score between relevant objects within voxel $v$ (calculated based on $r_{ij}$ from step S2); $\tau > 0$ represents a temperature parameter; $occ(v) \in [0,1]$ represents an occupancy rate of voxel $v$; $OCC_{thresh} \in (0,1)$ represents an occupancy threshold; and $\|[\cdot]$ represents an indicator function. When two incompatible objects (such as a kettle and ice cream) are in the same voxel, $r_v$ is close to 0, $\exp(-r_v/\tau)$ is close to 1, resulting in a high penalty; when compatible objects (such as a book and a table) overlap, $r_v$ is close to 1, $\exp(-r_v/\tau)$ is close to 0, resulting in a very small penalty.

In the step S34, editing parameters are optimized.

The gradient descent algorithm is utilized to minimize the comprehensive loss function $L_{total}$, thereby obtaining the optimized editing parameter $\Theta^*$:

$$\theta^* = \underset{\theta}{\operatorname{argmin}} L_{total}(\theta)$$

the optimization process computes the gradient of the loss function with respect to the parameters via backpropagation:

$$\nabla_\theta L_{total} = \omega_1 \nabla_\theta L_{orientation} + \omega_2 \nabla_\theta L_{semantic} + \omega_3 \nabla_\theta L_{interference}$$

The parameters are updated: $\Theta^{(k+1)} = \Theta^{(k)} - \eta \nabla_\theta L_{total}$, where $n > 0$ represents the learning rate and k is the iteration count.

When the convergence condition $$\|L_{total}^{(k+1)} - L_{total}^{(k)}\| < \epsilon$$

is met ($\epsilon > 0$, and $\epsilon$ represents a convergence threshold) or a maximum number of iterations is reached, the optimized editing parameters $\theta^*$ are output.

In an embodiment, specifically, the step S4 includes steps as follows.

A unified editing operation execution engine is established to perform precise transformations on the three-dimensional scene based on the optimized editing parameters. First, the target object extraction phase is conducted, the target object point cloud $O_{target}$ from the original scene is precisely separated and the contextual information of its surrounding environment $C_{context} = \{p_i \in P \| p_i -$ centroid $(O_{target}) | \leq r_{context}\}$ is recorded, where $r_{context} > 0$, and context represents the context radius parameter.

Then the corresponding transformation operations are executed: for deletion operations, $P_{new} = P \backslash O_{target}$ is performed, where $\backslash$ represents a set difference operation; for generation operations, a new object $O_{new} = G_{shape}(\phi_{gen}, p_{gen})$ is created via a shape generation network $G_{shape}$ and $P_{new} = P \cup O_{new}$ is executed, where $N_{gen}$ represents the number of points of the generated object; for movement operations, the calculated transformation matrix is applied to the target object $O'_{target} = T_{move} \cdot [p_i; 1] \| p_i \in O_{target}$, thereby obtaining the point cloud of the moved object; for swap operations, two transformation matrices $O'_1 = \{T_1 \cdot [p_i; 1] \| p_i \in O_1\}$, and $O'_2 = \{T_2 \cdot [p_i; 1] \| p_i \in O_2\}$ are simultaneously applied.

During the transformation execution process, the system maintains the topological consistency of the scene, updating the spatial adjacency graph $G'_{spatial} = (V'_G, E'_G)$, where $V'_G$ corresponds to the edited object instances and $E'_G$ represents the updated spatial adjacency relationships. The spatial relationships between objects are recalculated based on geometric distances and support relationships.

The supporting surface information $F' = \{f'_k | k = 1, 2, \ldots, K'_f\}$ is synchronously updated, where $K'_f$ represents the total number of supporting surfaces after editing. Re-detect horizontal supporting surfaces in the edited scene and update the load-bearing capacity and available area information for each supporting surface. Define the edited complete scene as $P_{edited} = P_{new} \cup \{O'_{target}\} \cup \{environment point cloud\}$.

In an embodiment, specifically, the method further includes step S5, which includes scene reconstructing and visual consistency maintaining.

Intelligent reconstruction of the scene is performed after the completion of editing operations to restore the visual integrity and physical plausibility of the scene. Scene reconstruction consists of two key components: in-situ repair and adaptation to new locations.

For in-situ repair, the void regions left after object removal are filled using contextual information from the surrounding environment. The void region $H=\{p_i|p_i\in O_{target}\}$ and the repair mask $M_{repair}$ are defined, where $M_{repair}[i]=1$ represents that point $p_i$ needs to be repaired. A reconstruction algorithm based on a multi-modal generative model is employed:

$$P_{repaired}, C_{repaired} = G_{multi}(P, C_{origin}, M_{repair}, s_{guide}, L_{light})$$

where $G_{multi}$ represents a multi-modal generative network, $C_{origin}=\{c_i|i=1, \ldots, N\}$ represents the original texture color data (RGB values), $s_{guide}\in S$ represents the semantic guiding label, and $L_{light}=(l_{pos}, l_{int})$ represent lighting parameters, with $l_{pos}$ representing a light source position and $l_{int}$ representing a light intensity (in unit of lux)

For adaptation to new locations, interaction effects between objects and the environment are generated, including shadow casting $S_{shadow}=\text{ShadowCast}(O'_{target}, L_{light}, F')$, simulation of contact deformation, and adjustment of material reflection. The set of contact points $P_{contact}=\{p_i\in O'_{target}|\text{distance}(p_i, f_{env})<\varepsilon_{contact}$ is calculated, where $\varepsilon_{contact}>0$ represents a contact threshold, $f_{env}\in F'$ represents an environmental supporting surface, and distance $(\cdot,\cdot)$ represents the Euclidean distance function. Corresponding contact shadows and minor environmental indentations are generated, and realistic physical interactions are simulated through local geometric adjustments $f'_{env}=f_{env}+\Delta h_{deform}\cdot n_{env}$, where $\Delta h_{deform}$ represents a deformation amount and $n_{env}$ with $\|n_{env}\|_2=1$ is the normal vector of the environmental surface, ensuring the visual authenticity of the editing results.

In an embodiment, specifically, the method further includes step S6, which includes quality assessing and semantic constraint rule updating.

A data quality assessment system is established oriented towards the application needs of embodied intelligence, ensuring that the generated edited scenes can provide high-quality perceptual data for robot training. A multi-dimensional quality assessment function is defined as follows:

Geometric Consistency Assessment:

$$Q_{geom} = \frac{1}{|P_{edited}|}\sum_{p_i\in P_{edited}} I_{geometric}(p_i, N_{local}(p_i))$$

where $I_{geometric}$ represents a geometric integrity indicator function, and $N_{local}(p_i)=\{p_j\in P_{edited}|\|p_j-p_i\|_2\le r_{local}\}$ represents the local neighborhood of point $p_i$, $r_{local}>0$, and $r_{local}$ represents a neighborhood radius.

Physical Plausibility Assessment:

$$Q_{physics} = \frac{1}{\sum_{j=1}^{M'}w_j}\sum_{j=1}^{M'}w_j\cdot F_{stability}(O'_j, F')$$

where M' represents the total number of objects after editing, $w_j>0$, and $w_j$ represents a weight of object $O'_j$, and $F_{stability}$ represents the stability function, verifying the physical stability of all objects.

Semantic Consistency Assessment:

$$Q_{semantic} = \frac{1}{|R_{semantic}|}\sum_{r\in R_{semantic}} V_{rule}(r, G'_{spatial})$$

where $V_{rule}$ represents a rule verification function, checking whether the edited scene violates semantic rules.

Based on the quality assessment results, the disclosure automatically updates the semantic constraint rules in the step S2 to achieve continuous learning and improvement of the system. The current editing case (E, $Q_{total}$) is added to the historical database $\mathcal{H}$, where the comprehensive quality score $Q_{total}=\lambda_{geom}Q_{geom}+\lambda_{physics}Q_{physics}+\lambda_{semantic}Q_{semantic}$, and the weight coefficients $\lambda_{geom}, \lambda_{physics}, \lambda_{semantic}$ satisfying $\lambda_{geom}+\lambda_{physics}+\lambda_{semantic}=1$.

To achieve adaptive quality assessment, an uncertainty-based dynamic weighting mechanism is introduced. For a batch of generated scene sets $$\{P_{edited}^{(k)}\}_{k=1}^{K},$$

the batch variance of each metric $$\sigma_m^2 = \frac{1}{K}\sum_{k=1}^{K}(Q_m^{(k)} - \bar{Q}_m)^2$$

is calculated, where $m\in\{geom, physics, semantic\}$, m represents the metric category, and $$\bar{Q}_m = \frac{1}{K}\sum_{k=1}^{K} Q_m^{(k)},$$

$\bar{Q}_m$ represents the sample mean. Based on the inverse variance weighting principle, the adaptive weights $$\lambda_m = \frac{(\sigma_m^2)^{-1}}{\sum_{n\in(geom, physics, semantic)}(\sigma_n^2)^{-1}}$$

are calculated, thereby ensuring that metrics with smaller variance receive higher weights.

To achieve efficient dataset expansion, the system supports batch editing mode, a set of edited scenes $$\{P_{edited}^{(k)}\}_{k=1}^{K}$$

from a single original scene $P_{origin}$ is generated by randomizing editing parameters $\Theta_{rand}\sim \mathcal{D}_{param}(\mu, \sigma^2)$, where $K>>1$ and K represents an expansion factor, $\mathcal{D}_{param}$ represents a parameter distribution (e.g., multivariate Gaussian distribution), $\mu$ and $\sigma^2$ are a mean vector and a variance vector parameter, respectively, significantly increasing the diversity and coverage of training data, providing rich scene perception training resources for embodied intelligence systems.

As shown in FIG. 2, a system for the semantic perception editing of objects in a three-dimensional scene is provided, which includes a three-dimensional scene analyzing module, a semantic relationship learning module and an editing operation execution module. These three modules achieve close collaboration through standardized data interfaces and message-passing mechanisms, forming a complete end-to-end editing pipeline. The system architecture follows a hierarchical design principle, with the bottom layer being the data processing layer (scene analyzing), the middle layer being the intelligent decision-making layer (semantic learning), and the top layer being the operation execution layer (editing execution), ensuring the system's scalability and maintainability. The modules are outlined as follows.

The three-dimensional scene analyzing module is configured to analyze, using the three-dimensional instance segmentation network, the input point cloud data of the three-dimensional scene to recognize the multiple object instances and the semantic labels of the multiple object instances in the three-dimensional scene, extract the global spatial structural information of the three-dimensional scene and the scene environmental features, and locate the current position of the target object in the three-dimensional scene.

The semantic relationship learning module is configured to learn, using the Bayesian dynamic updating mechanism, the set of semantic relationship rules between the multiple object instances, establish an object semantic attribute database, and dynamically generate the dynamic semantic constraints based on the set of semantic relationship rules and the scene environmental features.

The editing operation execution module is configured to receive the editing instruction and perform parametric processing, verify the rationality of the editing operations based on the dynamic semantic constraints, optimize the verified editing operations through the comprehensive loss minimizing function, and execute the corresponding editing operations to generate the edited three-dimensional scene.

In addition, the editing operation execution module is also provided with a scene reconstructor and a quality assessment component. The scene reconstructor utilizes a multi-modal generative network to repair void regions and generate physical interaction effects, ensuring the visual consistency of the editing results. After scene reconstruction, the quality of the edits is evaluated from three dimensions: geometric, physical, and semantic. Feedback information is then conveyed to the learning module.

The three modules are connected through well-defined data interfaces and message-passing protocols to achieve loosely coupled connections. The three-dimensional scene analyzing module passes the analyzed object instances, spatial relationship graphs, and environmental features to the semantic relationship learning module and the editing operation execution module through standardized data structures. After receiving the scene analyzing results, the semantic relationship learning module generates dynamic semantic constraints in combination with historical experience and passes the constraints to the editing operation execution module for operation verification. After completing the editing operations, the editing operation execution module calculates the quality assessment results and feeds them back to the semantic relationship learning module, forming a closed-loop learning mechanism. Communication between modules employs asynchronous message queues, which support concurrent processing and load balancing, thereby enhancing the overall performance of the system.

Figure 3:
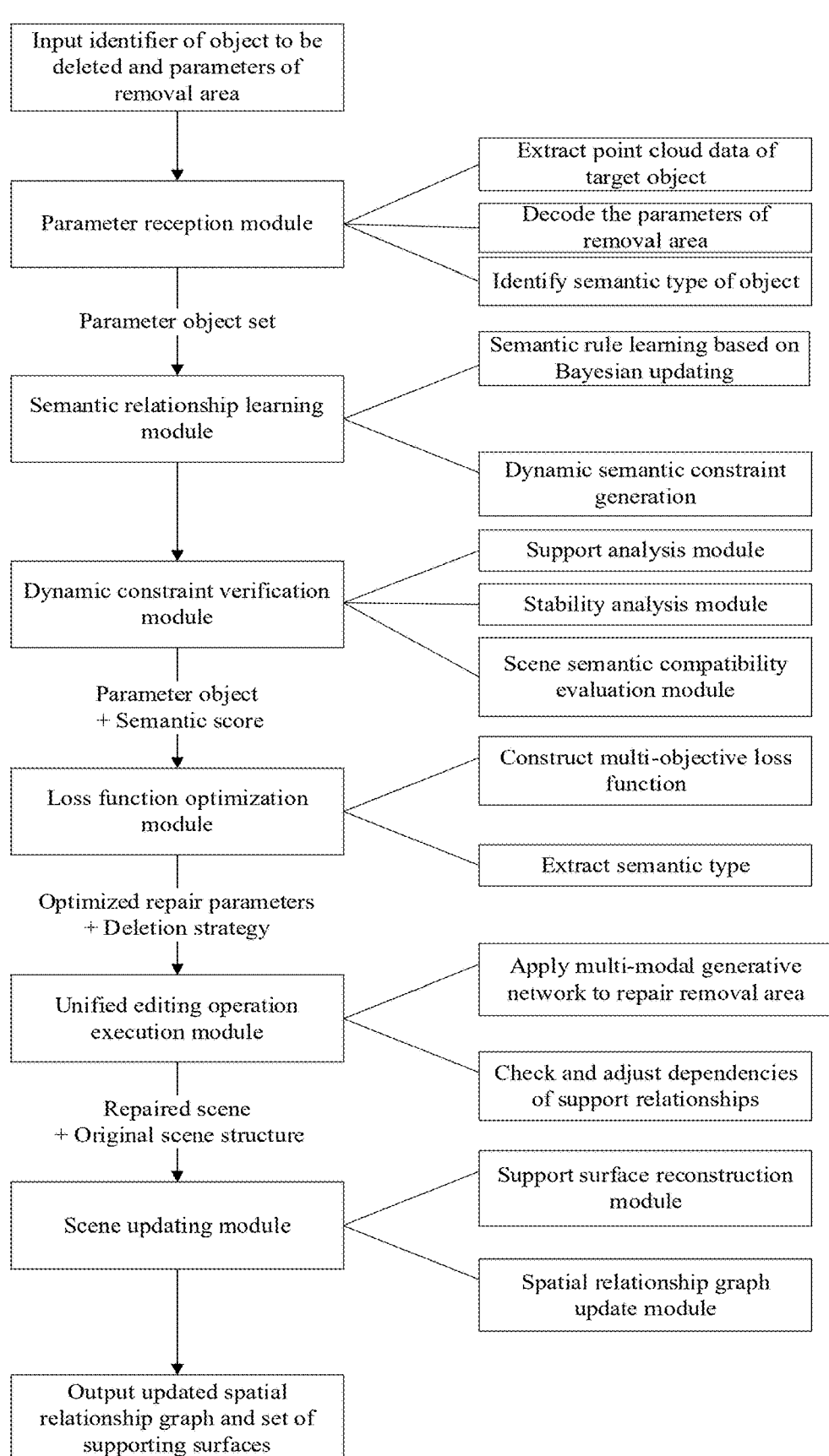
FIG. 3 illustrates a schematic executing diagram of a deletion operation of an object according to the embodiment of the disclosure.
Figure 4:
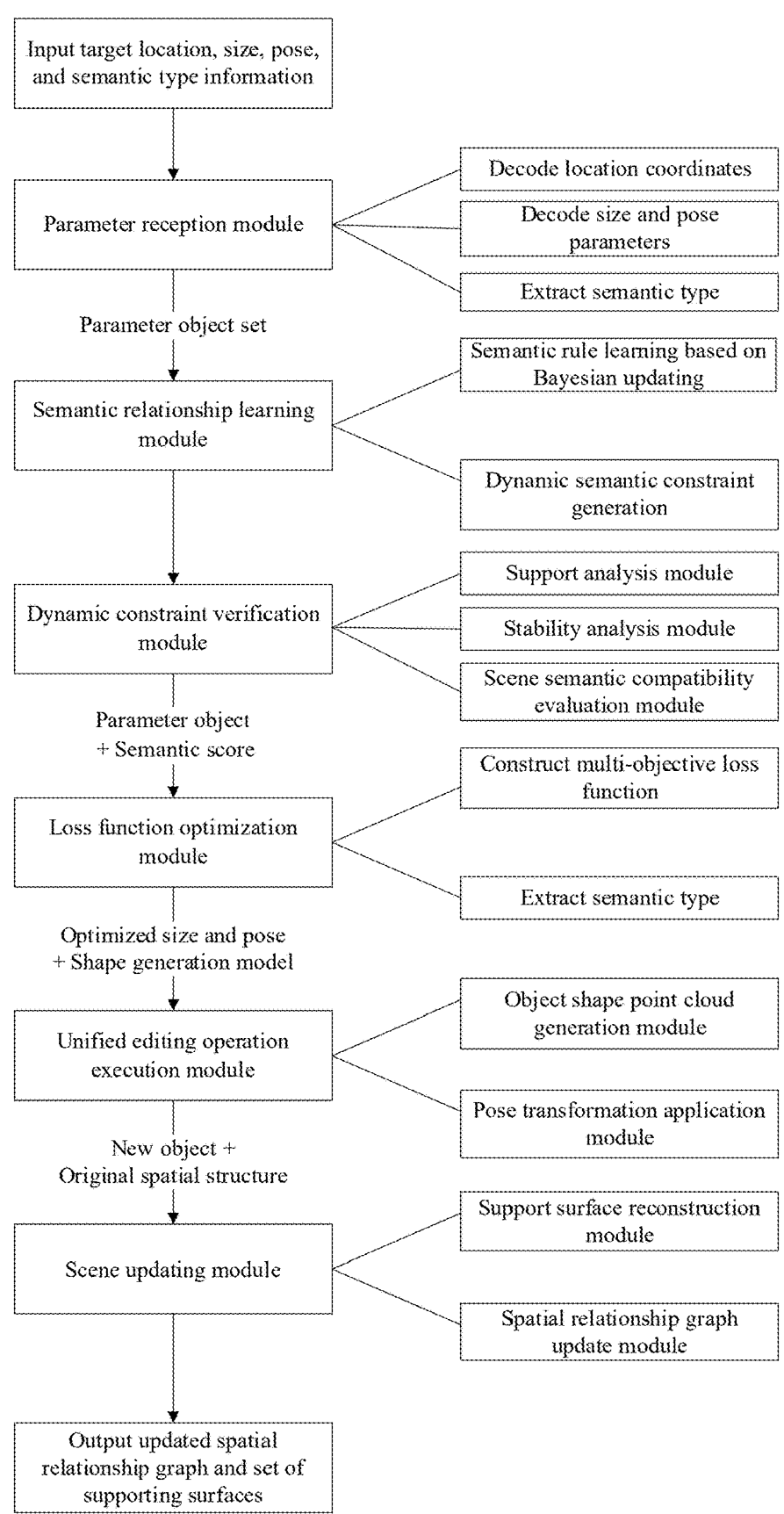
FIG. 4 illustrates a schematic executing diagram of a generation operation of an object according to the embodiment of the disclosure.
Figure 5:
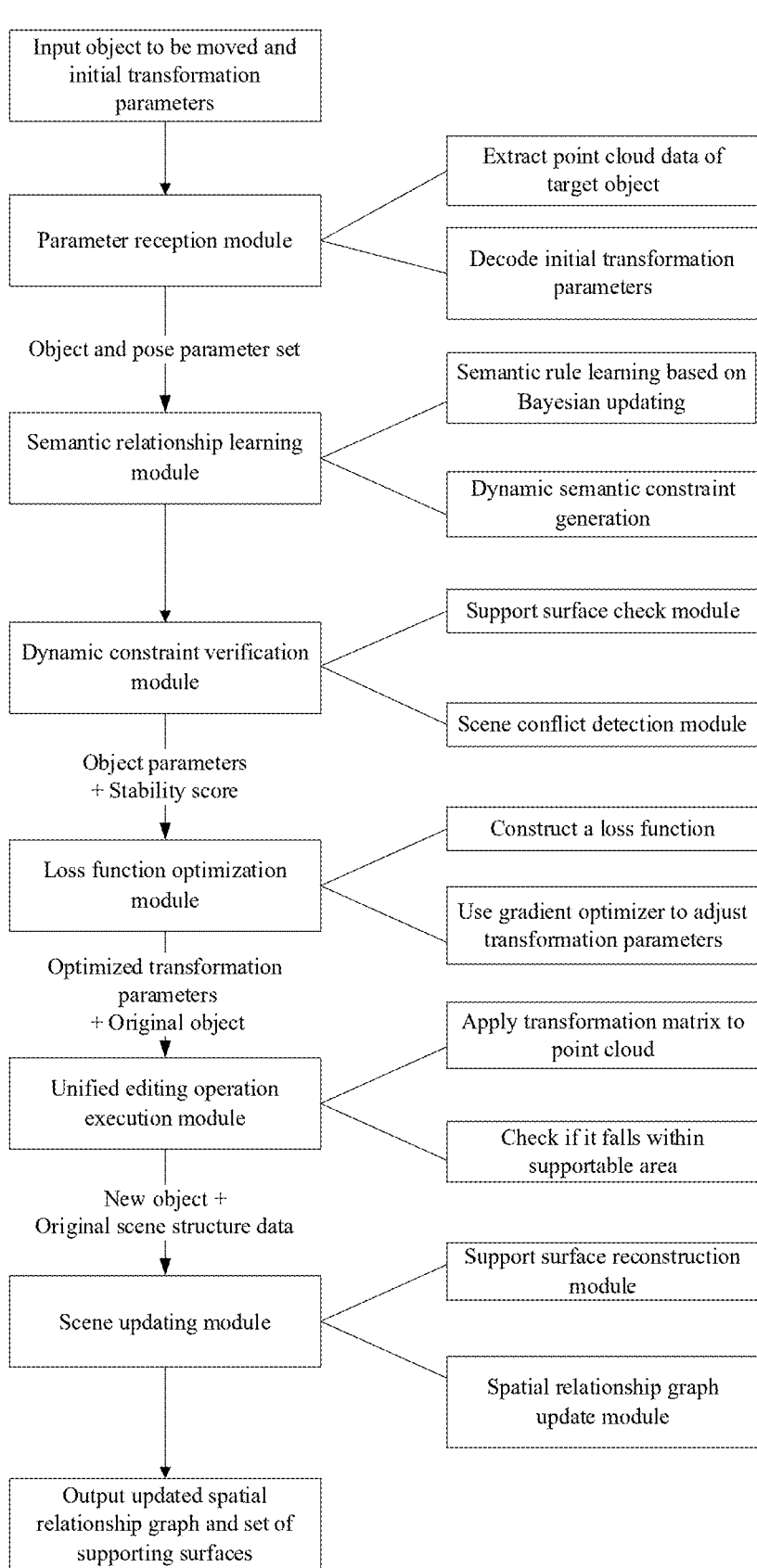
FIG. 5 illustrates a schematic executing diagram of a movement operation of an object according to the embodiment of the disclosure.
Figure 6:
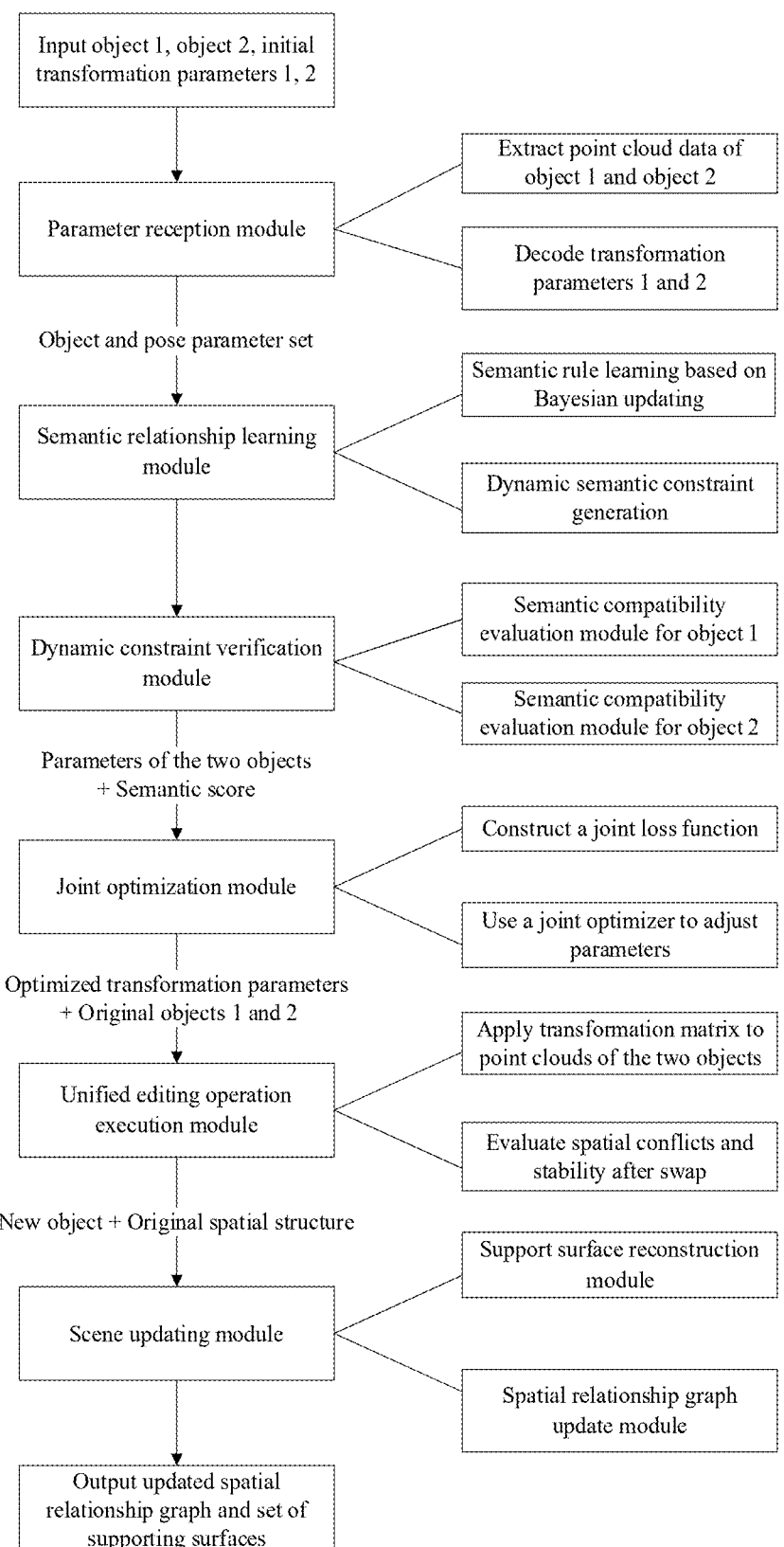
FIG. 6 illustrates a schematic executing diagram of a swap operation of an object according to the embodiment of the disclosure.

As shown in FIGS. 3 to 6, which are execution schematic diagrams for the deletion, generation, movement, and swap operations, respectively. As shown in FIG. 3, during the execution of the deletion operation, the semantic relationship learning module learns the semantic relationship rules from historical cases based on the Bayesian dynamic updating mechanism. A dynamic constraint verification module generates support, stability, and compatibility constraints and calculates the comprehensive semantic constraint score. A loss function optimization module constructs a comprehensive loss function that includes orientation deviation, semantic matching, and voxel interference. A unified editing operation execution module applies a multi-modal generative network to repair the void regions. A scene updating module reconstructs the set of supporting surfaces and updates the spatial relationship graph. The overall operation demonstrates intelligent deletion and three-dimensional scene reconstruction capabilities based on dynamic semantic constraints, with each submodule working together to ensure the rationality of the deletion operation in both semantic and spatial dimensions. As shown in FIG. 4, a modular structure of the generation operation includes a parameter reception module, a semantic relationship learning module, a dynamic constraint verification module, a loss function optimization module, a unified editing operation execution module, and a scene updating module. Each of these modules is further divided into several submodules, such as the parameter decoder, Bayesian update engine, semantic constraint calculator, and gradient optimizer, the support analysis module, the stability analysis module, the scene semantic compatibility evaluation module, the support surface reconstruction module, the spatial relationship graph update module, the support surface check module, and the scene conflict detection module. The modules are interconnected with arrows labeled with data annotations to clearly indicate the input and output data flows (e.g., "Input: Target location and semantic type, Output: Optimized editing parameters"), fully demonstrating the complete data flow and dynamic semantic constraint processing from instruction reception to new object generation and scene updating, reflecting the ability of the system to jointly model physical properties and semantic relationships. As shown in FIG. 5, a modular structure of the movement operation includes a parameter reception module, a semantic relationship learning module, a dynamic constraint verification module, a loss function optimization module, a unified editing operation execution module, and a scene updating module. These modules work together based on a shared dynamic semantic constraint interface, with submodules such as the transformation parameter decoder, semantic compatibility evaluator, constraint score calculator, and joint optimizer further demonstrating the system's fine control over spatial relationship maintenance and movement rationality. The data flow, such as "Input: Object identification (ID) and transformation matrix, Output: Optimized transformation parameters," clearly expresses the displacement logic and constraint propagation mechanism guided by dynamic semantic constraints. As shown in FIG. 6, the swap operation can be structurally regarded as a coupled operation of two objects based on a pair of swap transformations. The structure diagram shows that it mainly consists of a parameter reception module, a semantic relationship learning module, a dynamic constraint verification module, a loss function optimization module, a unified editing operation execution module, and a scene updating module. This structure emphasizes the symmetry and synchronicity of the swap operation based on dynamic semantic constraints, with secondary submodules including the swap parameter decoder, cross-semantic compatibility evaluator, and joint constraint optimizer. Dual-channel data arrows are used to separately identify the input and output paths of the two target objects, making the semantic reasoning and transformation logic based on Bayesian learning more interpretable.

In an embodiment, each of the three-dimensional scene analyzing module, the semantic relationship learning module, the editing operation execution module, the parameter reception module, the dynamic constraint verification module, the loss function optimization module, the unified editing operation execution module, the scene updating module, the support analysis module, the stability analysis module, the scene semantic compatibility evaluation module, the support surface reconstruction module, the spatial relationship graph update module, the support surface check module, and the scene conflict detection module is embodied by at least one processor and at least one memory coupled to the at least one processor, and the at least one memory is stored with computer programs executable by the at least one processor.

The edited three-dimensional scene of the disclosure can be directly used for robot-training-data generation and algorithm optimization. Specifically, the edited three-dimensional scene $P_{edited}$ is converted into a robot-readable data format: a virtual camera renders the scene from multiple viewpoints to produce a sequence of 640×480 depth images, the corresponding color images are synchronously generated, and a semantic label is assigned to every pixel to form a semantic-segmentation map. Leveraging the updated spatial-relationship graph $G'_{spatial}$ and supporting-surface information F, the system automatically produces feasible robot navigation paths: the path-planning algorithm treats the free-space regions $V_{free}$ free as navigable areas, regards the object-instance boundaries as obstacle constraints, and utilizes the height information of the supporting surfaces to detect steps and ramps.

For robot grasp-task training, the edited scene uses move operations to place the target object at different locations, thereby generating diverse grasping scenarios; each scenario contains the three-dimensional (3D) position coordinates and orientation of the target object, the geometric constraints of the surrounding environment, and the material and friction coefficient of the supporting surface. Based on the object's semantic-attribute vector $\alpha_i[w_i,v_i,\mu_i,\sigma_i,\tau_i]^T$ and the supporting constraints $C_{support}$, the system computes feasible robot grasp poses; it trains the robot to avoid collisions with other objects during grasping by exploiting the updated spatial-relationship graph. The edited scene outputs, through the multi-modal generative network $G_{multi}$, point-cloud data containing object geometry, RGB textures for object-recognition training, semantic labels for scene-understanding training, and depth information for distance-estimation training. By analyzing the semantic-relationship rules $R_{semantic}$ in the edited scene, the robot learns common spatial relationships between objects, e.g., a cup is normally placed on a table, books are usually near a bookshelf, etc. and improves its perception capability in complex environments by generating scenes that include varying lighting conditions $L_{light}$ and different material reflection properties.

The system establishes a closed-loop verification and optimization mechanism. After the robot is trained in the edited scene and then performs tasks in the real environment, it collects performance metrics such as navigation success rate, object recognition accuracy, grasp success rate, and collision avoidance rate. The robot's actual performance is used as input for quality assessment to update the quality score $Q_{total}=\lambda_{geom}Q_{geom}+\lambda_{physics}Q_{physics}+\lambda_{semantic}Q_{semantic}$. Based on the robot's performance feedback, the semantic relationship rules are automatically adjusted through the Bayesian update formula to optimize the quality of subsequent scene editing.

Through the above illustrations, the disclosure modularly models and differentially implements the semantic-driven mechanisms for different editing operations while maintaining a unified semantic constraint framework, effectively enhancing the intelligence level and system versatility of three-dimensional scene editing. The module hierarchy, data flow, and sub-structural relationships in these four diagrams establish a clear connection between semantic preservation and operation execution, forming a complete closed-loop chain from semantic perception to physical transformation, providing strong support capabilities for embodied intelligence tasks.

The above description is merely a preferred embodiment of the disclosure and is not intended to limit the disclosure. Any modifications, equivalent substitutions, improvements, etc., made within the spirit and principles of the disclosure, shall all be included within the scope of protection of the disclosure.

What is claimed is:

1. A method for semantic perception editing of objects in a three-dimensional scene, the method comprising the following steps:

S1, analyzing, using a three-dimensional instance segmentation network, input point cloud data of the three-dimensional scene to obtain multiple object instances and semantic labels of the multiple object instances, a set of supporting surfaces of the multiple object instances, a spatial relationship graph among the multiple object instances, and scene environmental features, and determining a current position and a bounding box of a target object based on an editing instruction, comprising:

S11, decomposing, using the three-dimensional instance segmentation network, the input point cloud data of the three-dimensional scene into the multiple object instances, wherein each of the multiple object instances comprises a point set and a corresponding one of the semantic labels;

S12, extracting global spatial structural information of the three-dimensional scene, wherein the global spatial structural information comprises the set of supporting surfaces being capable of bearing the multiple object instances, free space regions, and the spatial relationship graph among the multiple object instances;

S13, obtaining the scene environmental features through analyzing the input point cloud data of the three-dimensional scene, wherein the scene environmental features comprise supporting surface load-bearing information, object material properties, and spatial distribution information; and S14, receiving the editing instruction and determining the current position, and the bounding box of the target object in the three-dimensional scene based on the editing instruction;

S2, learning, using a Bayesian dynamic updating mechanism, a set of semantic relationship rules between the multiple object instances from a historical editing case database, and dynamically generating dynamic semantic constraints based on the set of semantic relationship rules and the scene environmental features;

S3, converting, using a unified parametric framework, editing operations into a standardized mathematical representation, calculating a comprehensive semantic constraint score based on the dynamic semantic constraints to verify rationality of the editing operations, thereby to determine verified editing operations, and optimizing, based on a comprehensive loss minimizing function, the verified editing operations to obtain optimized editing parameters; and S4, transforming, using a unified editing operation execution engine, the three-dimensional scene based on the optimized editing parameters, and updating the spatial relationship graph and the set of supporting surfaces to obtain the edited three-dimensional scene.

2. The method as claimed in claim 1, wherein the step S2 comprises:

S21, establishing a database $A=\{(s_i, \alpha_i)|s_i \in S\}$ associating the semantic labels of the multiple object instances with semantic attribute vectors of the multiple object instances, where $s_i$ represents a corresponding semantic label of an i-th object instance of the multiple object instances, S represents a set of the semantic labels, and $\alpha_i$ represents a semantic attribute vector of the i-th object instance of the multiple object instances, which includes a weight, a volume, a material hardness, a surface roughness, and a thermal conductivity;

S22, defining the set of semantic relationship rules $R_{semantic}=\{r_{ij} \ r_{ij}: s_i \times s_j \rightarrow [0,1], s_i, s_j \in S\}$ among the multiple object instances, where $r_{ij}$ represents a compatibility score function between the semantic label $s_i$ and a semantic label $s_j$ of a j-th object instance of the multiple object instances, and $r_{ij}$ represents a semantic relationship rule between the i-th object instance and the j-th object instance;

S23, treating the semantic relationship rule $r_{ij}$ as a posterior probability following a Beta distribution $Beta(\alpha_{ij}, \beta_{ij})$, where $\alpha_{ij}$ represents an accumulated parameter of successful evidence corresponding to the semantic relationship rule $r_{ij}$, and $\beta_{ij}$ represents an accumulated parameter of failed evidence corresponding to the semantic relationship rule $r_{ij}$;

S24, updating posterior parameters based on a feedback loss from the historical editing case database $$\mathcal{H} = \{(E^{(h)}, Q_{total}^{(h)}) \mid h = 1, 2, \dots, NH\},$$

where $E^{(h)}$ represents an h-th historical editing operation, $$Q_{total}^{(h)}$$

represents a quality score corresponding the h-th historical editing operation, and NH represents a total number of historical cases in the historical editing case database; and S25, dynamically generating, based on the learned set of semantic relationship rules and the scene environmental features, wherein the dynamic semantic constraints comprise a support constraint, a stability constraint, and a compatibility constraint.

3. The method as claimed in claim 2, wherein in the step S24, formulas for updating the posterior parameters are expressed as follows:

$$\alpha_{ij}^{(t+1)} = \alpha_{ij}^{(t)} + \left(1 - L_{feedback}^{(h)}\right) \cdot \kappa$$

$$\beta_{ij}^{(t+1)} = \beta_{ij}^{(t)} + L_{feedback}^{(h)} \cdot \kappa$$

18

-continued $$r_{ij}^{(t+1)} = \frac{\alpha_{ij}^{(t+1)}}{\alpha_{ij}^{(t+1)} + \beta_{ij}^{(t+1)}}$$

where $$L_{feedback}^{(h)} = 1 - Q_{total}^{(h)}$$

represents the feedback loss, t represents a current time step, t+1 represents an updated time step, and k represents an updated intensity factor, configured to control feedback sensitivity;

wherein the method further comprises: after updating the posterior parameters $$\alpha_{ij}^{(t+1)}$$

and $$\beta_{ij}^{(t+1)},$$

taking a posterior mean $$r_{ij}^{(t+1)} = \alpha_{ij}^{(t+1)} / \left(\alpha_{ij}^{(t+1)} + \beta_{ij}^{(t+1)}\right)$$

as a new rule value.

4. The method as claimed in claim 2, wherein formulas for calculating the comprehensive semantic constraint score are expressed as follows:

$$S_{semantic} = \gamma_1 \cdot C_{support} + \gamma_2 \cdot C_{stability} + \gamma_3 \cdot C_{compatibilty}$$

$$C_{support} = \mathbb{1}[is\_support\_surface(f_{dest}) \wedge w_{target} \leq w_{max}(f_{dest})]$$

$$C_{stability} = \mathbb{1}[contact\_area(O_{target}, f_{dest}) \geq A_{min}]$$

$$C_{compatibility} = \mathbb{1}[r_{target,env} \geq \rho_{threshold}]$$

where $S_{semantic}$ represents the comprehensive semantic constraint score; $C_{support}$ represents the support constraint; $C_{stability}$ represents the stability constraint; $C_{compatibility}$ represents the compatibility constraint; $\gamma_1$, $\gamma_2$, and $\gamma_3$ represent weight coefficients for $C_{support}$, $C_{stability}$, and $C_{compatibility}$, respectively, and satisfy $\gamma_1+\gamma_2+\gamma_3=1$; $\mathbb{1}[\cdot]$ represents an indicator function; $f_{dest}$ represents a target support surface selected from the set of support surfaces; is_support_surface(·) represents a support surface determination function; $w_{target}$ represents a weight of the target object; $w_{max}(f_{dest})$ represents a maximum load-bearing capacity of the target support surface $f_{dest}$; $\wedge$ represents a logical operator; contact_area(·,·) represents a contact area calculation function; $O_{target}$ represents the target object; $A_{min}$ represents a minimum contact area required to ensure stability; $r_{target,env}$ represents a compatibility score between the target object and environment calculated based on the set of semantic relationship rules $R_{semantic}$; and $\rho_{threshold}$ represents a compatibility determination threshold.

5. The method as claimed in claim 2, wherein in the step S3, formulas of the comprehensive loss function are expressed as follows:

$$L_{total} = \omega_1 \cdot L_{orientation} + \omega_2 \cdot L_{semantic} + \omega_3 \cdot L_{interference}$$

$$L_{orientation} = \|a_{target} \odot (\theta_{pose} - \theta_{ideal})\|_2^2$$

$$L_{semantic} = \|E(G_{spatial}) - E(\hat{G}_{spatial})\|_F$$

$$L_{interference} = \sum_{v \in V_{voxel}} \exp(-r_v / \tau) \cdot \mathbb{I}[occ(v) > occ_{thresh}]$$

where $L_{total}$ represents the comprehensive loss function; $L_{orientation}$ represents an orientation deviation loss; $L_{semantic}$ represents a graph embedding matching loss; $L_{interference}$ represents a voxel semantic interference penalty; $\omega_1$, $\omega_2$, and $\omega_3$ represent weight coefficients for $L_{orientation}$, $L_{semantic}$, and $L_{interference}$, respectively, and satisfy $\omega_1 + \omega_2 + \omega_3 = 1$; $\alpha_{target}$ represents a semantic attribute vector of the target object; $\odot$ represents element-wise multiplication; $\theta_{pose}$ represents a current orientation; $\theta_{ideal}$ represents an ideal orientation;

$$\|\cdot\|_2^2$$

represents a squared L2 norm; $E(\cdot)$ represents an embedding matrix generated by a graph neural network; $G_{spatial}$ represents a current spatial relationship graph; $\hat{G}_{spatial}$ represents a predicted post-editing spatial relationship graph; $\|\cdot\|_F$ represents a Frobenius norm; $V_{voxel}$ represents a voxel grid partition of the three-dimensional scene; $r_v$ represents an average compatibility score between relevant objects within a voxel v; $\tau$ represents a temperature parameter; $occ(v)$ represents an occupancy rate of the voxel v; $OCC_{thresh}$ represents an occupancy threshold; and $\mathbb{I}[\cdot]$ represents an indicator function.

6. The method as claimed in claim 1, wherein the editing operations comprise a deletion operation, a generation operation, a movement operation, and a swap operation, the deletion operation is used to define a removal area and an area of influence, the generation operation is used to determine a generation location and object parameters, the movement operation comprises a transformation matrix, and the swap operation is used to define a pair of swap transformations for two objects of the multiple object instances.

7. The method as claimed in claim 1, further comprising: scene reconstructing and visual consistency maintaining, comprising:

defining void regions and repair masks, wherein the void regions are areas left vacant after object removal, and the repair masks are used to identify points to be repaired;

performing, using a multi-modal generation network, in situ repair on the edited three-dimensional scene, filling the void regions left after the object removal with surrounding environmental context information, and outputting a repaired point cloud and texture; and performing new location adaptation processing on the repaired point cloud and texture to generate interaction effects between the multiple object instances and the environment, comprising:

calculating a set of contact points, generating shadow projection effects, simulating contact deformation, and adjusting material reflection, in order to perform the visual consistency maintaining.

8. The method as claimed in claim 7, wherein the scene reconstructing comprises:

in-situ repairing and new locations adapting;

filling the void regions left after object removal using contextual information from surrounding environment and defining the void regions and the repair masks by employing a reconstruction algorithm; and generating interaction effects between the multiple object instances and the environment, and calculating a set of contact points between the multiple object instances and the environment, generating contact shadows and minor environmental indentations, and simulating realistic physical interactions through local geometric adjustments.

9. The method as claimed in claim 8, wherein the reconstruction algorithm is expressed as follows:

$$P_{repaired}, C_{repaired} = G_{multi}(P, C_{origin}, M_{repair}, s_{guide}, L_{light})$$

where P represents a point cloud of the three-dimensional scene, $P_{repaired}$ represents a repaired point cloud of the three-dimensional scene after the object removal and subsequent hole filling, $C_{repaired}$ represents a repaired color data associated with the a repaired point cloud $P_{repaired}$, $G_{multi}$ represents a multi-modal generative network, $C_{origin}$ represents an original texture color data, $s_{guide}$ represents a semantic guiding label, and $L_{light}$ represent lighting parameters, $M_{repair}$ represents the repair masks.

10. The method as claimed in claim 1, further comprising:

quality assessing and semantic constraint rule updating, comprising:

calculating, using a multi-dimensional quality assessment system, a comprehensive quality score of geometric consistency, physical plausibility, and semantic consistency; adding a current editing case and the comprehensive quality score to the historical editing case database; automatically updating, based on the comprehensive quality score as a feedback loss, the set of semantic relationship rules through a Bayesian update formula to achieve feedback learning and the semantic constraint rule updating.

11. The method as claimed in claim 1, wherein the step S3 further comprises:

S31, receiving the editing instruction obtained from step S1, establishing the unified parametric framework for the editing operations, and converting the editing operations into the standardized mathematical representations;

S32, calculating the comprehensive semantic constraint score based on the dynamic semantic constraints obtained from step S2 to verify the rationality of the editing operations;

S33, constructing the comprehensive loss minimizing function for the verified editing operations; and S34, minimizing, using a gradient descent algorithm, the comprehensive loss minimizing function to thereby obtain the optimized editing parameter.

12. The method as claimed in claim 11, wherein the step S31 further comprises:

for deletion operation, defining a removal region $R_{remove}$ and an area of influence $R_{affect}$, where $r_{affect}$ represents a radius of influence;

for generation operation, determining a generation location $p_{gen}$ and object parameters $\phi_{gen}=(s_{type}, d_{size}, \theta_{pose})$, where $s_{type}$ represents a type of a generated object, $d_{size}$ represents a size parameter of the generated object, and $\theta_{pose}$ represents a pose parameter of the generated object;

for movement operation, wherein core parameters of the movement operations comprise a transformation matrix $T_{move}=[R|t]$, where a rotation matrix R and a translation vector t are transformation parameters; and for swap operation, defining a pair of swap transformations for two objects.

13. The method as claimed in claim 11, wherein the step S34 further comprises:

calculating a gradient of the comprehensive loss minimizing function $L_{total}$ with respect to the editing parameters via back propagation:

$$\nabla_\theta L_{total} = \omega_1 \nabla_\theta L_{orientation} + \omega_2 \nabla_\theta L_{semantic} + \omega_3 \nabla_\theta L_{interference}$$

updating parameters: $\Theta^{(k+1)}=\Theta^{(k)}-\eta\nabla_\Theta L_{total}$, where $\Theta$ represents the set of operation parameters, $\nabla_\Theta$ represents a gradient operation with respect to the set of operation parameters $\Theta$, $L_{total}$ represents the comprehensive loss function; $L_{orientation}$ represents an orientation deviation loss, calculating the deviation of the object's orientation relative to the ideal orientation; $L_{semantic}$ represents a graph embedding matching loss, quantifying the expected deviation of semantic relationships before and after editing; $L_{interference}$ represents a voxel semantic interference penalty, assessing the degree of spatial interference; $\omega_1$, $\omega_2$, and $\omega_3$ represent weight coefficients for $L_{orientation}$, $L_{semantic}$, and $L_{interference}$, respectively, and satisfy $\omega_1+\omega_2+\omega_3=1$; $\eta$ represents a learning rate and k represents an iteration count; and k+1 represents a next iteration count;

in response to a convergence condition $$\left\| L_{total}^{(k+1)} - L_{total}^{(k)} \right\| < \epsilon$$

being met, $\epsilon>0$ representing the convergence threshold, or a maximum number of iterations being reached, outputting the optimized editing parameters $\Theta^*$.

14. The method as claimed in claim 1, wherein the step S4 comprises:

establishing the unified editing operation execution engine to perform transformations on the three-dimensional scene based on the optimized editing parameters, comprising:

conducting a target object extraction phase to separate a target object point cloud $O_{target}$ from the three-dimensional scene, and recording contextual information of surrounding environment $C_{context}=\{p_i\in P\|\|p_i-\text{centroid}(O_{target})\|\leq r_{context}\}$ of the three-dimensional scene, where $r_{context}$ represents a context radius parameter, $O_{target}$ represents target object identifier, P represents the point cloud data of the three-dimensional scene, and $p_i$ represents an i-th target object point cloud;

executing transformation operations corresponding to the editing operations;

synchronously updating supporting surface information $F'=\{f'k|k=1,2, \ldots, K'_f\}$, where $K'f$ represents a total number of supporting surfaces after the transformation operations, f'k represents a k-th supporting surface in the edited scene; k represents the index of the supporting surface, configured to identify different supporting surfaces;

re-detecting horizontal supporting surfaces in the edited three-dimensional scene and updating a load-bearing capacity and available area information for each horizontal supporting surface; and defining an edited complete scene as $P_{edited}=P_{new}\cup\{O'_{target}\}\cup\{\text{environment point cloud}\}$, where $P_{new}$ represents a new point cloud data after the editing operation, $O'_{target}$ represents the transformed point cloud of the target object, and environment point cloud represents a background environmental point cloud in the scene excluding the target object, including static environmental elements such as walls and floors.

15. The method as claimed in claim 14, wherein the executing transformation operations corresponding to the editing operations comprises:

for generation operation, creating a new object $O_{new}=G_{shape}(\phi_{gen}, p_{gen})$ via a shape generation network $G_{shape}$ and executing $P_{new}=P\cup O_{new}$, where $\phi_{gen}$ represents the objective paramters, $p_{gen}$ represents the target position coordinates for object generation, $G_{shape}$ represents a shape generation network, configured to generate a corresponding three-dimensional geometric shape based on semantic type and parameters, $P_{new}$ represents a new point-cloud data after the editing operation, $O_{new}$ represents the point-cloud data of the newly created object, P represents an original 3-D scene point-cloud dataset before the editing operation;

for movement operation, applying a calculated transformation matrix to the target object $O'_{target}$, thereby obtaining a point cloud of a moved object; and for swap operation, simultaneously applying two transformation matrices of two objects $O'_1$ and $O'_2$.

16. A system for the semantic perception editing of objects in a three-dimensional scene configured to perform the method as claimed in claim 1, comprising:

a three-dimensional scene analyzing module, configured to analyze, using the three-dimensional instance segmentation network, the input point cloud data of the three-dimensional scene to recognize the multiple object instances and the semantic labels of the multiple object instances in the three-dimensional scene, extract the global spatial structural information of the three-dimensional scene and the scene environmental features, and determine the current position of the target object in the three-dimensional scene;

a semantic relationship learning module, configured to learn, using the Bayesian dynamic updating mechanism, the set of semantic relationship rules between the multiple object instances, establish an object semantic attribute database, and dynamically generate the dynamic semantic constraints based on the set of semantic relationship rules and the scene environmental features; and an editing operation execution module, configured to receive the editing instruction and perform parametric processing, verify the rationality of the editing operations based on the dynamic semantic constraints, optimize the verified editing operations through the comprehensive loss minimizing function, and execute the corresponding editing operations to generate the edited three-dimensional scene;

wherein each of the three-dimensional scene analyzing module, the semantic relationship learning module, and the editing operation execution module is embodied by at least one processor and at least one memory coupled to the at least one processor, and the at least one memory is stored with computer programs executable by the at least one processor.

17. The system as claimed in claim 16, further comprising:

a dynamic constraint verification module, configured to generate the dynamic semantic constraints and calculate the comprehensive semantic constraint score;

a loss function optimization module, configured to construct the comprehensive loss minimizing function, wherein the comprehensive loss minimizing function comprises orientation deviation, semantic matching, and voxel interference; and a scene updating module, configured to reconstruct the set of supporting surfaces and update the spatial relationship graph;

wherein each of the dynamic constraint verification module, the loss function optimization module, and the scene updating module is embodied by the at least one processor and the at least one memory coupled to the at least one processor, and the at least one memory is stored with the computer programs executable by the at least one processor.

18. The system as claimed in claim 16, wherein the editing operation execution module comprises a scene reconstructor and a quality assessment component, the scene reconstructor is configured to repair void regions and generate physical interaction effects through a multi-modal generative network, thereby ensuring the visual consistency of the editing results, and the quality assessment component is configured to evaluate a quality of the edited three-dimensional scene from geometric, physical, and semantic and convey to a feedback information to the semantic relationship learning module.

19. A non-transitory computer-readable storage medium stored with a computer program, wherein the computer program is configured, when being executed by a processor, to implement the method for semantic perception editing of the objects in the three-dimensional scene as claimed in claim 1.

20. A method for semantic perception editing of objects in a three-dimensional scene, comprising the following steps:

S1, analyzing, using a three-dimensional instance segmentation network, input point cloud data of the three-dimensional scene to obtain multiple object instances and semantic labels of the multiple object instances, a set of supporting surfaces of the multiple object instances, a spatial relationship graph among the multiple object instances, and scene environmental features, and determining a current position and a bounding box of a target object based on an editing instruction;

S2, learning, using a Bayesian dynamic updating mechanism, a set of semantic relationship rules between the multiple object instances from a historical editing case database, and dynamically generating dynamic semantic constraints based on the set of semantic relationship rules and the scene environmental features, comprising:

S21, establishing a database $A=\{(s_i, \alpha_i)|s_i \in S\}$ associating the semantic labels of the multiple object instances with semantic attribute vectors of the multiple object instances, where $s_i$ represents a corresponding semantic label of an i-th object instance of the multiple object instances, S represents a set of the semantic labels, and $\alpha_i$ represents a semantic attribute vector of the i-th object instance of the multiple object instances, which includes a weight, a volume, a material hardness, a surface roughness, and a thermal conductivity;

S22, defining the set of semantic relationship rules $R_{semantic}=\{r_{ij}|r_{ij}: s_i \times s_j \rightarrow [0,1], s_i, s_j \in S\}$ among the multiple object instances, where $r_{ij}$ represents a compatibility score function between the semantic label $s_i$ and a semantic label $s_j$ of a j-th object instance of the multiple object instances, and $r_{ij}$ represents a semantic relationship rule between the i-th object instance and the j-th object instance;

S23, treating the semantic relationship rule $r_{ij}$ as a posterior probability following a Beta distribution $Beta(\alpha_{ij}, \beta_{ij})$, where $\alpha_{ij}$ represents an accumulated parameter of successful evidence corresponding to the semantic relationship rule $r_{ij}$, and $\beta_{ij}$ represents an accumulated parameter of failed evidence corresponding to the semantic relationship rule $r_{ij}$;

S24, updating posterior parameters based on a feedback loss from the historical editing case database $$\mathcal{H} = \{(E^{(h)}, Q^{(h)}_{total}) \mid h = 1, 2, \dots , NH\},$$

where $E^{(h)}$ represents an h-th historical editing operation, $$Q^{(h)}_{total}$$

represents a quality score corresponding the h-th historical editing operation, and NH represents a total number of historical cases in the historical editing case database; and S25, dynamically generating, based on the learned set of semantic relationship rules and the scene environmental features, wherein the dynamic semantic constraints comprise a support constraint, a stability constraint, and a compatibility constraint;

S3, converting, using a unified parametric framework, editing operations into a standardized mathematical representation, calculating a comprehensive semantic constraint score based on the dynamic semantic constraints to verify rationality of the editing operations, thereby to determine verified editing operations, and optimizing, based on a comprehensive loss minimizing function, the verified editing operations to obtain optimized editing parameters; and S4, transforming, using a unified editing operation execution engine, the three-dimensional scene based on the optimized editing parameters, and updating the spatial relationship graph and the set of supporting surfaces to obtain the edited three-dimensional scene.

* * * * *